United States Patent [19]

Mashburn et al.

[11] Patent Number: 5,413,090
[45] Date of Patent: May 9, 1995

[54] HEAT DISTRIBUTING APPARATUS FOR GAS BARBECUES

[76] Inventors: James S. Mashburn; Jerry P. Mashburn, both of 213 Rivo Alto Canal, Long Beach, Calif. 90803

[21] Appl. No.: 27,673

[22] Filed: Mar. 8, 1993

[51] Int. Cl.$^6$ ............................................. F24C 15/18
[52] U.S. Cl. ................... 126/246; 126/41 R; 126/27; 126/389
[58] Field of Search .............. 126/41 R, 27, 40, 39 C, 126/39 K, 373, 389, 390, 25 R, 246

[56] References Cited

U.S. PATENT DOCUMENTS

| | | | |
|---|---|---|---|
| 4,099,512 | 7/1978 | Noonan | 126/373 X |
| 4,694,816 | 9/1987 | Fabbro | 126/27 X |
| 5,125,393 | 6/1992 | Levitin | 126/373 |

*Primary Examiner*—Larry Jones
*Attorney, Agent, or Firm*—Fulwider Patton Lee & Utecht

[57] ABSTRACT

An apparatus for distributing heat between the heat source and grill of a gas burning barbecue or kettle, vaporizing and controlling food liquids that fall through the cooking grill, and for easily converting the cooking characteristics of a barbecue to that of a range if so desired. The apparatus is comprised of two articular parts including a flat apertured plate and cap. The plate is horizontally situated so that an aperture is located directly over a gas burner. The plate includes an array of inwardly and upwardly projecting teeth around the aperture for supporting a cooking vessel just above the heat source for range style cooking. The cap fits over the aperture for spreading heat from the gas burner for conventional barbecue style cooking.

14 Claims, 4 Drawing Sheets

HEAT DISTRIBUTING APPARATUS FOR GAS BARBECUES

BACKGROUND OF THE INVENTION

1. Field of the Invention

The present invention relates to devices for improving the cooking characteristics and usefulness of barbecues and in particular to plates or baffles incorporated between the heat source and grill of a barbecue.

2. Description of the Prior Art

The heat source of a traditional barbecue is a coal bed, which produces a broad, even heat beneath the grill. This heat further includes the vapors of food-liquids burning on the heat source. Solutions for simulating these cooking characteristics in a gas burning barbecue, have included various devices which operate between the gas burner and the grill. Typically these devices more evenly disperse convective heat from the burner, and provide a hot substrate to catch and evaporate the food-liquids dripping from the grill.

The most conventional solution known in the art is the provision of a bed of porous lava rocks beneath the grill which are heated above the gas burners. While the rock is effective in distributing heat from the burner, it must be very porous to avoid explosion, and therefore tends to soak up volatile liquids from the cooking food, ignite, and burn the food. Further, the bed of lava rocks shares some of the disadvantages in regard to mess and storage with traditional coal burning barbecues.

An alternative solution is disclosed by Miller, U.S. Pat. No. 4,403,597 filed Sep. 13, 1983. Miller's so-called heat transfer device replaces the bed of lava rocks with a rough, perforated, metal plate. Miller discloses prevention of "flame up" as a primary objective of his heat conductive plate. The plate perforations are designed to let the juices drop through, to avoid accumulation of a major portion of the food liquids. This means that the food liquids would be landing on the burner orifices and accumulating in the bottom of the barbecue shell, which is clearly problematic.

The coal burning or gas burning barbecues considered in their entirety exhibit an additional problem. It is often taken for granted in the art, that the barbecue is an accessory cooking appliance with additional cooking appliances ready at hand. However, barbecues are often used in remote cooking applications such as outdoors, camping, or boating, where a range or oven may in fact not be at hand. In this situation, the need to boil water, heat coffee or stew, or pan fry food is nearly impossible or at best very fuel inefficient on a barbecue where the heat is designed to be dispersed and "barbecue-like".

Therefore the need is anticipated for a novel device which can be used between the grill and heat source of a barbecue, to adequately distribute heat beneath the grill, control and vaporize food liquids falling through the grill, and further allow manipulation of the heat source to convert between a broadly distributed barbecue heat and a specific range-type heat to make the barbecue more versatile.

OBJECTS AND ADVANTAGES OF THE INVENTION

The present invention obviates the problems associated with the prior art, comprising a novel apparatus for distributing heat between the heat source and grill of a barbecue or kettle, vaporizing and controlling food liquids that fall through the cooking grill, and for easily converting the cooking characteristics of a barbecue to that of a range if so desired.

The preferred embodiment of the present invention includes two simple articular parts. A flat plate which is solid at its margins and including at least one aperture per burner, located above the burner. This aperture further includes an array of inwardly and upwardly projecting teeth around its inside perimeter. A second part, a subconical cap fits over the aperture of the plate, and is held there on the inwardly and upwardly projecting teeth. This cap typically includes negative inclines descending from a ridge or apex at the highest point of the cap correlating to a position most directly over the burner heat source. Removal of the cap, with the plate remaining, provides an arrangement resembling a range burner with a surrounding open rack for placing cooking vessels directly over the heat source.

This two part articular arrangement has many advantages over the prior art when used in its articulated mode, with the cap fit over the plate aperture. The cap creates a tent-like form over a burner heat source, so that convective heat is trapped within the tent-shape and forced downwardly and outwardly to rise around the lower margins of the cap. This avoids a concentration of heat above a burner heat source. Further, the plate and cap combination are closest to the heat source at the periphery of cooking basin, and furthest from the heat source directly above it, so that plate and cap physically radiate more uniformly across the cooking area. Additionally food liquids will vaporize on the heated plate and cap surfaces, while excess liquids will flow down the negatively inclined surfaces of the cap and disperse onto the flat margins of the plate which is easily removeable and cleanable.

In addition to providing superior barbecue cooking qualities, the present invention is novel in providing simple disengagement of the cap from the plate, so that the toothed aperture of the plate provides a stable substrate for setting cooking vessels directly over, and close to the heat source. Thus, by simply removing the barbecue grill and then the aperture cap, the barbecue or kettle is converted into a range appliance.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements of modes of operation that are properly within the scope of the appended claims.

BRIEF DESCRIPTION OF THE DRAWINGS

Novel features and advantages of the present invention, in addition to those mentioned above, will become apparent to those skilled in the art from reading the following detailed description in conjunction with the accompanying drawings wherein.

DESCRIPTION OF THE PREFERRED EMBODIMENT

Figure 1:
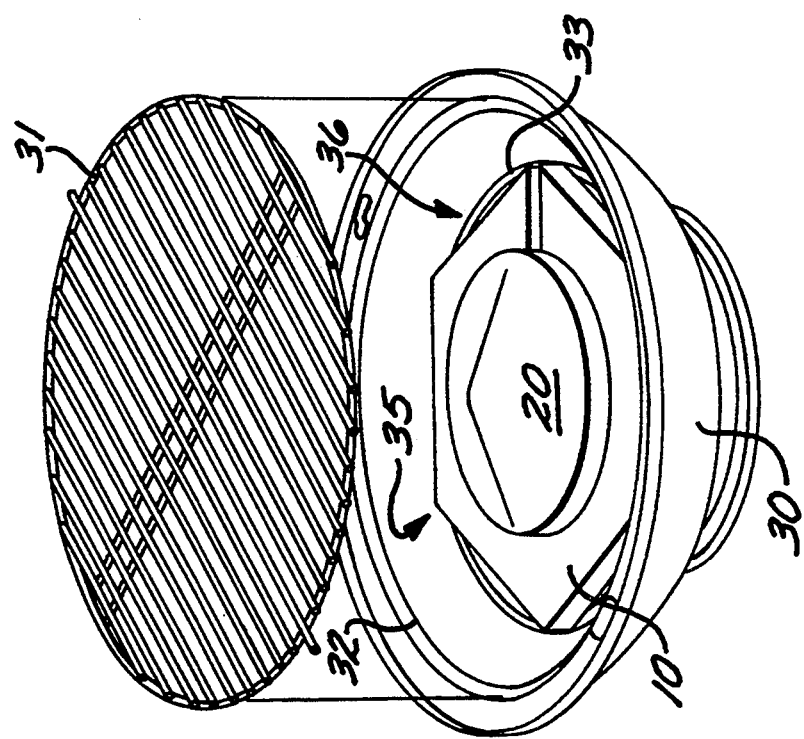
FIG. 1 is a pictorial view of a conventional bowl-shaped barbecue with the grill elevated to illustrate the present invention nested therein.

Referring to FIG. 1, a barbecue 30 is shown with a conventional grill 31 elevated from a grill support means 32 which normally comprises a lip located near the upper rim of the barbecue body indicated at 30. A similar supporting means, comprising a formed lip 33 below grill 31 provides support for the presently disclosed apparatus including plate 10 and cap 20. It is to be noticed that the outer edge of plate 10 is formed to contact lip 33 at discrete locations giving the plate a stable platform and leaving open spaces along the outer peripheral margin of the plate and insides of the barbecue. One such space is indicated generally by arrow 36, and formed between two corner contact locations, with one such corner indicated generally by arrow 35. In a rectilinear barbecue, spaces between contact locations are easily be effected by scalloping or faceting recesses into the margin of the plate.

Figure 2:
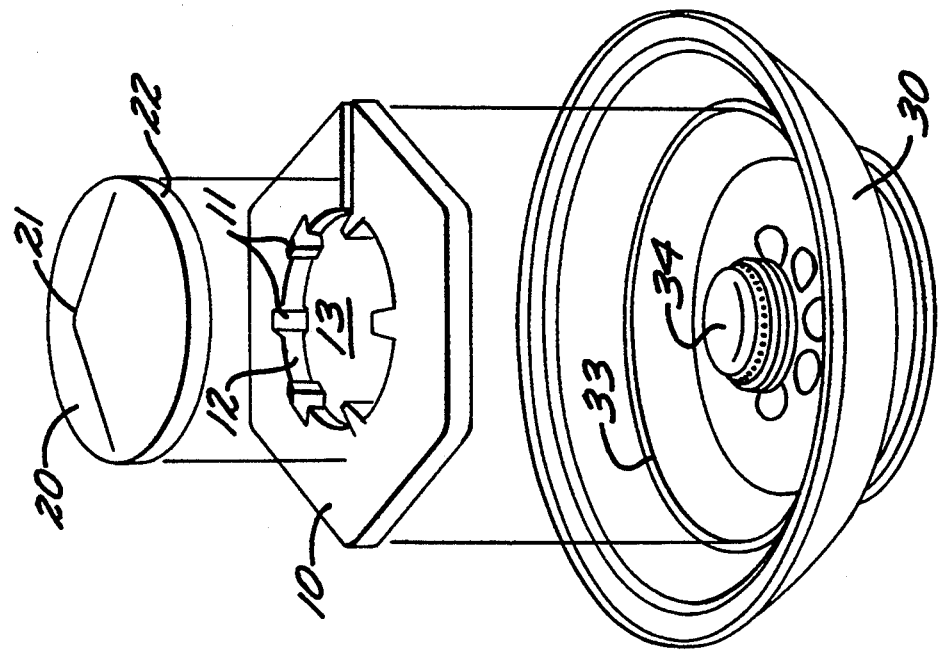
FIG. 2 is the same pictorial view with the grill removed, and the present invention with the disarticulated plate and cap elevated to expose a single burner in the bottom of the barbecue.

Referring now to FIG. 2, cap 20 and plate 10 are shown elevated above barbecue 30 so that a conventional single burner 34 is exposed. Supporting lip 33 is formed to horizontally support plate 10 above the level of burner 34 so that the plate and cap 20 do not hinder its normal operation. It is clear in FIG. 2 that the cap and plate are two singular parts with other distinguishing features revealed.

Plate 10 is substantially flat with a hole opening or aperture 13 normally centered over the burner location. A row of lobate spurs or teeth 11 project inwardly and upwardly from the inner margin or aperture lip 12 surrounding aperture 13. Cap 20 is substantially subconical or tent-like in shape with negatively inclined surfaces descending from a central ridge or apex 21 at the highest point from its base 22. The cap is substantially hollow underneath and fits like an operculum or slightly raised lid over aperture 13.

Figure 3:
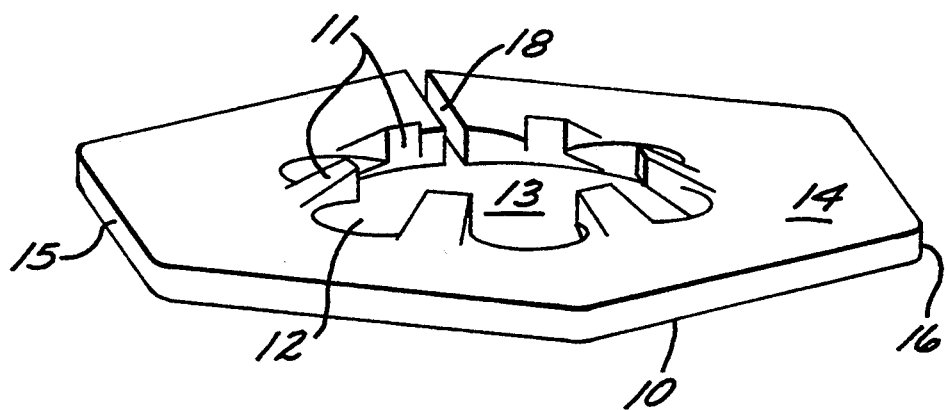
FIG. 3 is a pictorial view of the plate.

Referring now to FIG. 3, the plate is normally composed of a refractory material such as cordierite, which is commonly used inside kilns. Metal is also a suitable material, which would also allow for forming the plate integrally into the barbecue if so desired. The aperture lip 12 is visible in the saddles between the upwardly angled teeth 11. Around the aperture, or apertures in the case of more than one burner, are substantially flat peripheral margins indicated generally at 14. The outer most marginal edge 15 is characterized by recessed and processed portions which will respectively leave a marginal gap or contact the barbecue for support. In the preferred embodiment edge 15 is faceted around its perimeter so that the facet corners indicated at 16 will contact the supporting sides of barbecue 30 (not shown). The strait facet edges between corners 16 will in effect create open recesses (not indicated) when juxtaposed to the curvalinear sides of a bowl-type barbecue pursuant to the exemplified embodiment. An open gap 18 in margin 14 is included for inserting a match or other incendiary device to ignite the burner when either the cap or a cooking vessel are on top of aperture 13.

Figure 4:
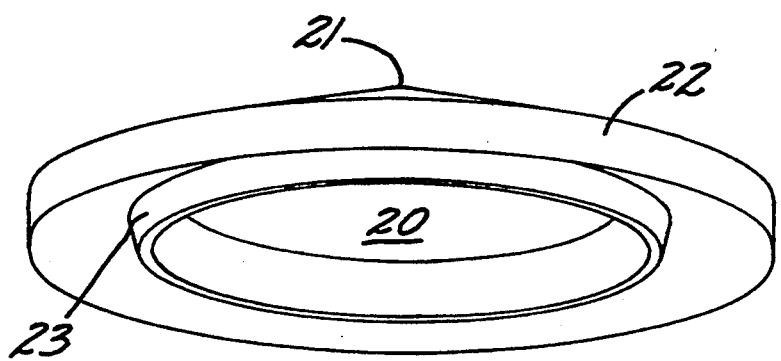
FIG. 4 is a pictorial view of the cap.

Referring now to FIG. 4, the cap is also normally composed of the same material as the plate. Projecting from the underside of the subconical cap is a secondary rim 23 which catches on the teeth 11 of plate 10 (not shown) so that the cap is held securely in place over aperture 13 (not shown) by gravity alone. It is also conceived that the cap could function as an operculum hingedly connected to the plate and displaceable by rotation over or away from the plate aperture. Also visible in FIG. 4 is the high dome-like apex 21, and the perimeter base indicated at 22.

Figure 5:
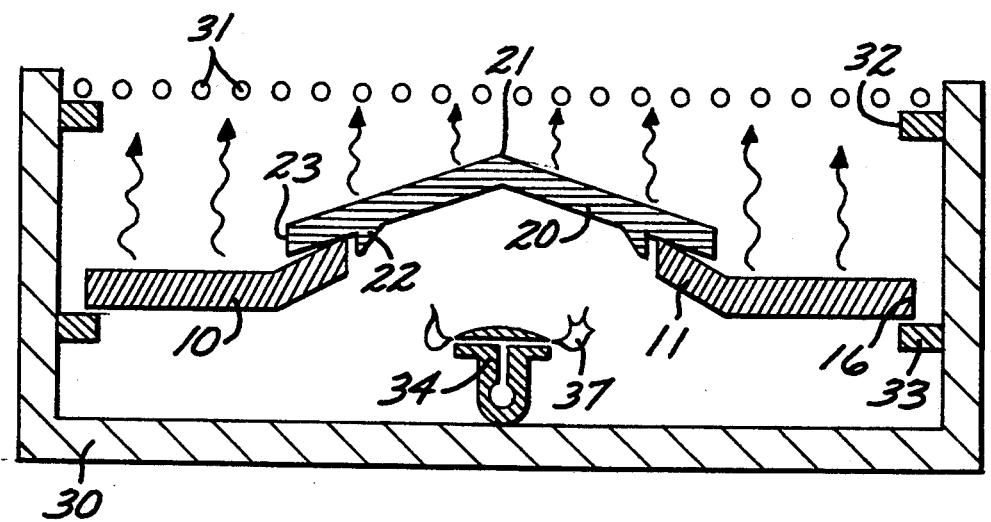
FIG. 5 is a full sectional side view of a conventional barbecue with the present invention in place, with the section chosen which shows the plate teeth around its aperture, and taken across the greatest breadth of the plate to include the corners bearing on the barbecue supports. Arrows represent radiative heat distribution.

Referring now to FIG. 5, which is a cross-section through barbecue 30, burner 34, plate 10 and cap 20, where the illustrated profile also includes teeth 11 and corners 16 of plate 10 where contact would be made on supporting lips 33. The cap profile includes interior rim 22, the incline apex 21, and the base indicated generally at 23.

FIG. 5 includes a schematic representation of potential radiative heat flux from the plate and cover combination, here illustrated by arrows. Flames 37 are illustrated coming from burner 34. Both FIG. 5 and FIG. 6 are accurate cross-sections of the preferred embodiment, still it will be noticed that the cross-sections would change unremarkably if, for instance, a rectilinear barbecue with a single longitudinal elongate burner were the chosen example for disclosure.

Figure 6:
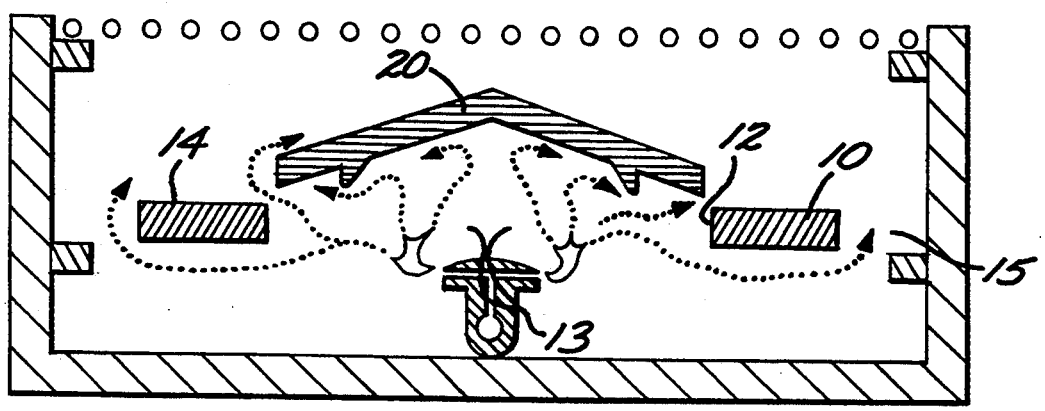
FIG. 6 is the same section as FIG. 5, except that a section is chosen which is in between teeth across the plate and includes the non-bearing outer margins of the plate. Arrows represent convective heat distribution.

Referring now to FIG. 6, which differs from FIG. 5 only in that the cross-section is taken across plate 10 to include the non-supportive recessed areas 15 of margin 14, and taken across the inner margin lip 12 of aperture 13 at the saddles between teeth 11 (not shown). Thus, included in this view are the major channels for potential convective heat flux when the cap is in place. This potential heat flux is schematically represented by the illustrated arrows.

The combination of the potential radiative heat flux schematic (of FIG. 5) and potential convective heat flux schematic (of FIG. 6) will convey some teaching of the potential heat distributing characteristics of the preferred embodiment. In complete contrast, conversion from the barbecue cooking arrangement previously described, to a range-top cooking arrangement, is done by simply removing or otherwise displacing cap 20 from its position on plate 10. The absence of cap 20 permits direct heat and flame to flow unhindered vertically through aperture 13 and between teeth 11, with the amount of heat and flame depending on how the burner is governed by the user.

Figure 7:
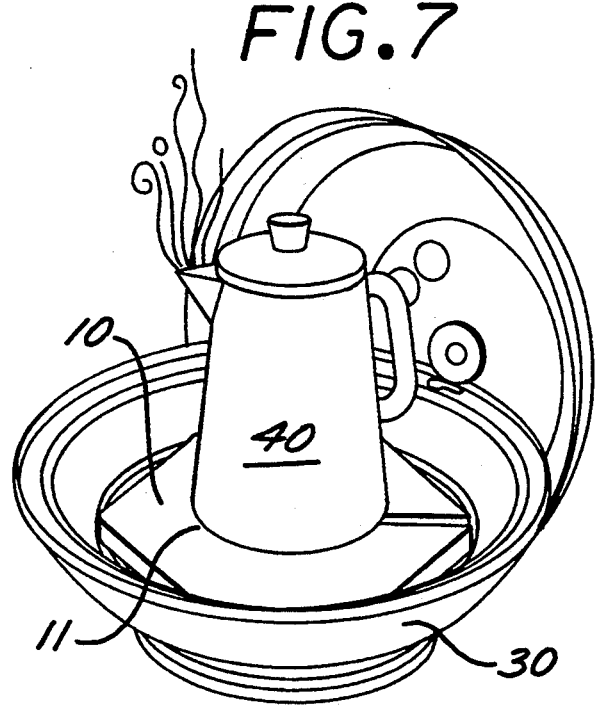
FIG. 7 is a pictorial view of a barbecue with the grill and cap removed, and a cooking vessel set on the plate in a range arrangement.

Referring now to FIG. 7, the range-top arrangement of the present invention is illustrated, including barbecue 30 with a pot of coffee 40 set on plate 10 and cooking. If the pot were removed the burner would be visible as shown in FIG. 8.

Figure 8:
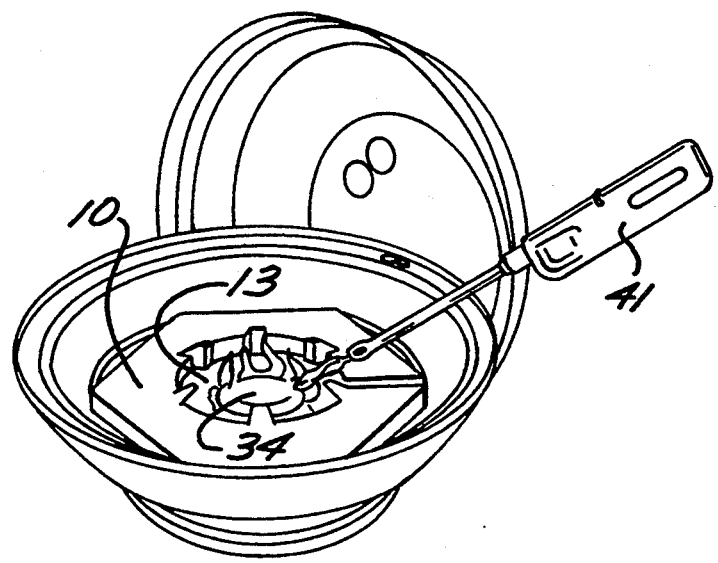
FIG. 8 is the same as FIG. 7 with the cooking vessel removed to expose the flaming burner underneath and show range cooking arrangement of the present invention.

Referring now to FIG. 8, burner 34 is visible through aperture 13 of plate 10, and a conventional incendiary device 41 is shown directed toward gap 18 as would be necessary to ignite burner 34 if, for instance, cover 20

(not shown) were in position over aperture 13 as appropriate for the barbecue cooking arrangement.

Referring now to FIGS. 1,2,3,4,7, and 8, the preferred embodiment is taught as applied to a conventional bowl-shaped barbecue, however, the cross-sectional views of the same embodiment as shown in FIGS. 5 and 6 teach the distinguishing features of the invention as applied to rectilinear barbecues with simple linear extrusions of the figures. Further, and for the sake of clarity, the exemplified barbecue is shown as having a single gas burner, whereas those persons skilled in the art will quickly understand, that for conventional multiple burners or conventional elongate burners the aperture 13 and cap 20 combination need only be multiplied or elongated (FIGS. 5 and 6 withstanding) accordingly within plate 10 to conform.

It may be thus seen that the objects of the present invention set forth herein, as well as those made apparent from the foregoing description are efficiently attained. While preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

We claim:

1. A heat distributing apparatus for gas burning barbecues or kettles comprising a plate having an aperture formed therein and configured so as to support a cooking vessel thereover in a non-occluding manner and a removable cap configured to cover said aperture whereby fitment of said cap over said aperture in said plate serves to divert upwardly flowing heat, while removal of said cap allows a cooking vessel supported by said plate to be directly subjected to heat flowing upwardly through said aperture.

2. An apparatus as recited in claim 1, further comprising an array of lobate teeth spurring upwardly and inwardly from the edges of said aperture, which conform and mate to an interior surface underneath said cap which rests thereon by gravity alone.

3. An apparatus as recited in claim 1 wherein said apparatus is supported within said barbecue or kettle by the marginal edges of said plate.

4. An apparatus for modifying the cooking characteristics of a gas burner positioned within a cooking device, comprising:
a plate having an aperture formed therein, said plate being configured for fitment within said cooking device above said burner such that said aperture is located directly over said burner;
means for supporting a cooking vessel on said plate over said aperture without occluding said aperture; and
a removable aperture cap for covering said aperture, wherein food supported on a grill above said plate with said cap in place is subjected to a dispersed barbecue-like heat pattern while removal of said cap causes a cooking vessel supported by said plate to be subjected to a concentrated range-like heat pattern.

5. An apparatus as recited in claim 4, wherein said plate and said aperture cap are solid one piece articles composed of the refractory material cordierite.

6. An apparatus as recited in claim 4, wherein said aperture is normally a hole conforming in planiform shape and breadth to the dimensions of the particular conventional burner and its flame profile.

7. An apparatus as recited in claim 4, wherein said supporting means around said aperture of said plate are normally lobate teeth projecting inwardly and upwardly from the perimeter of said aperture.

8. An apparatus as recited in claim 4, wherein said aperture cap is normally characterized by a an uppermost central apex or ridge, with sides inclined downwardly therefrom ending in a perimeter base, and having a substantial amount of interior space, as in the manner of tent-like forms.

9. The apparatus of claim 5, wherein aid aperture cap includes an interior ridge and shape such that it articulates with said supporting means around said aperture so that said aperture cap rests securely over said aperture.

10. An apparatus as recited in claim 4 wherein said apparatus is supported within the cooking device by the marginal edges of said plate.

11. Said plate as recited in claim 10, wherein said marginal edges are formed to permit some open circulation of heat therethrough.

12. An apparatus for alternatively providing range-top cooking in a gas barbecue or kettle comprising:
a plate situated by conventional mechanical means horizontally above at least one gas burner, with an opening through the plate located directly over said gas burners fixed in said gas barbecue or kettle;
means for supporting cooking vessels over said opening in said plate in a non-occluding manner, whereby said cooking vessels are heated directly by said gas burners; and
means to substantially cover said openings in said plate for conventional barbecue cooking.

13. An apparatus as recited in claim 12, wherein said means for supporting cooking vessels comprises an array of lobate teeth spurring upwardly and inwardly from the edges of said opening, operating as a whole like the rack of prongs over a range burner.

14. An apparatus as recited in claim 12, wherein said means to substantially cover said openings in said plate for conventional barbecue cooking comprise at least one subconical cap which articulates over said openings in lieu of a cooking vessel, and in combination with said plate serves to broadly distribute the local heat from said gas burners.

* * * * *